Jan. 4, 1966 W. S. FERRIS ETAL 3,227,814

APPARATUS FOR CORRELATING THE OPERATION OF SOUND REPRODUCING AND PICTURE PROJECTING DEVICES

Filed June 8, 1960

WARREN S. FERRIS
ROBERT M. JOHNSON
INVENTORS

BY R. Frank Smith
Robert F. Crocker
ATTORNEYS

United States Patent Office 3,227,814
Patented Jan. 4, 1966

3,227,814

APPARATUS FOR CORRELATING THE OPERATION OF SOUND REPRODUCING AND PICTURE PROJECTING DEVICES

Warren S. Ferris, Rochester, N.Y., and Robert M. Johnson, Houston, Tex., assignors to Eastman Kodak Company, Rochester, N.Y., a corporation of New Jersey Filed June 8, 1960, Ser. No. 34,759
5 Claims. (Cl. 179—100.1)

This invention relates to an apparatus adapted to be utilized in conjunction with a conventional sound recorder and reproducer and a remotely controllable picture projecting apparatus, such as a conventional slide projector, for correlating the operation of these units.

When projecting a series of still pictures by means of a slide projector, it is frequently desirable to combine with the projection a running commentary and/or appropriate background music. While this can be done by manually controlling a suitable record player and the slide projector while orally describing the scenes portrayed, it is much more desirable to provide a prerecorded commentary and/or background accompaniment and to automatically correlate the reproduction of such recorded material with the changing of the slides. Many systems have been proposed for accomplishing this result, one such system involving the recording of an audible or supersonic trigger pulse on the same sound track or on a separate sound track from that on which the commentary is recorded, and automatically controlling the slide-changing mechanism of the projector in response to such trigger pulses during playback of the sound. However, the apparatuses previously used for this purpose have been unduly complicated, relatively expensive, and have quite frequently required modification of either the sound reproducer, picture projector, or both.

It is an object of this invention to provide a relatively inexpensive and simple programming apparatus which may be used in conjunction with standard tape recording and reproducing units and picture projectors without any modifications of the latter and yet which will effectively correlate the operation thereof in the manner above described.

A further object is to provide such an apparatus which utilizes a single resonant circuit, preferably tuned to a relatively high, but audible frequency, in conjunction with appropriate electronic circuitry whereby the tuned circuit serves, during recording, as the main frequency-determining element of an oscillator useable to impress the desired triggering pulse on the tape and, during playback, serves as the frequency sensitive element of a frequency selective amplifier for effectively separating out the triggering pulse from the other audio output of the sound reproducer and causing the initiation of a slide-changing operation of the projector in response thereto.

Further objects will become apparent from the following description and claims particularly when considered in the light of the accompanying drawing wherein:

Figure 1:
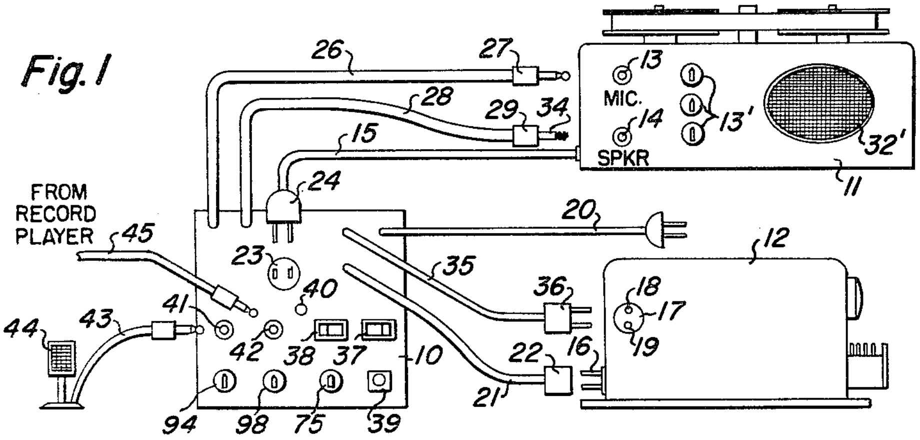
FIG. 1 is a somewhat diagrammatic view of our programming apparatus showing the manner in which it is connected to a conventional sound recorder/reproducer and a slide projector.

As shown in FIG. 1, our programming apparatus comprises a unit 10 adapted to be used in conjunction with a conventional tape recorder/reproducer 11 and picture projector 12. The recorder/reproducer 11 includes the usual microphone or audio input jack 13 used during recording operations to feed audio signals into an internal amplifier (not shown) for recording them in the usual manner. It also includes an audio output jack 14 adapted to receive a suitable plug for connecting an external speaker to the recorder/reproducer when it is desired to use such a speaker in place of the usual internal speaker 32 (FIG. 2) located behind the grill 32' for example. Recorder/reproducer 11 is provided with the usual control means generally indicated at 13' including, of course, suitable means for switching it from recording to reproducing operations. Power for the internal amplifier and for the tape drive motor (not shown) is obtained by means of a suitable power supply cable 15, the plug 24 of which is adapted to be plugged into a suitable source of alternating current.

Projector 12 may be of either the automatic or semi-automatic slide-changing type, both of which are well known in the art. It is provided with the usual power input plug 16 and, to facilitate slide-changing operations from a remote point, with a remote control receptacle 17 having a pair of terminals 18 and 19. In such projectors, slide-changing operation may be initiated by shorting together the terminals 18 and 19 either directly at the receptacle or by means of a suitable remote switch and extension cable (not shown) which may be plugged into the receptacle 17. While the manner in which this slide-changing operation is performed is of no importance to this invention, reference is made to the copending application of Robinson et al., Serial No. 696,516, filed Nov. 14, 1957, now U.S. Patent No. 2,969,711, for the details of such a projector.

The programming unit 10 itself is provided with a main power supply cable 20 adapted to be plugged into a suitable electrical outlet and which in turn feeds power by means of cable 21 to a receptacle 22 adapted to mate with the plug 16 of the projector 12 and also to the output receptacle 23 into which the plug 24 of the power cable 15 of the tape recorder 11 may be plugged. A two-conductor cable 26, preferably of shielded construction, terminates in a conventional plug 27 forming signal output terminals and adapted to be inserted in the microphone jack 13 of the recorder. A second similar cable 28 terminates in a special plug 29 adapted to be inserted in the speaker jack 14.

Figures 2, 3, 4:
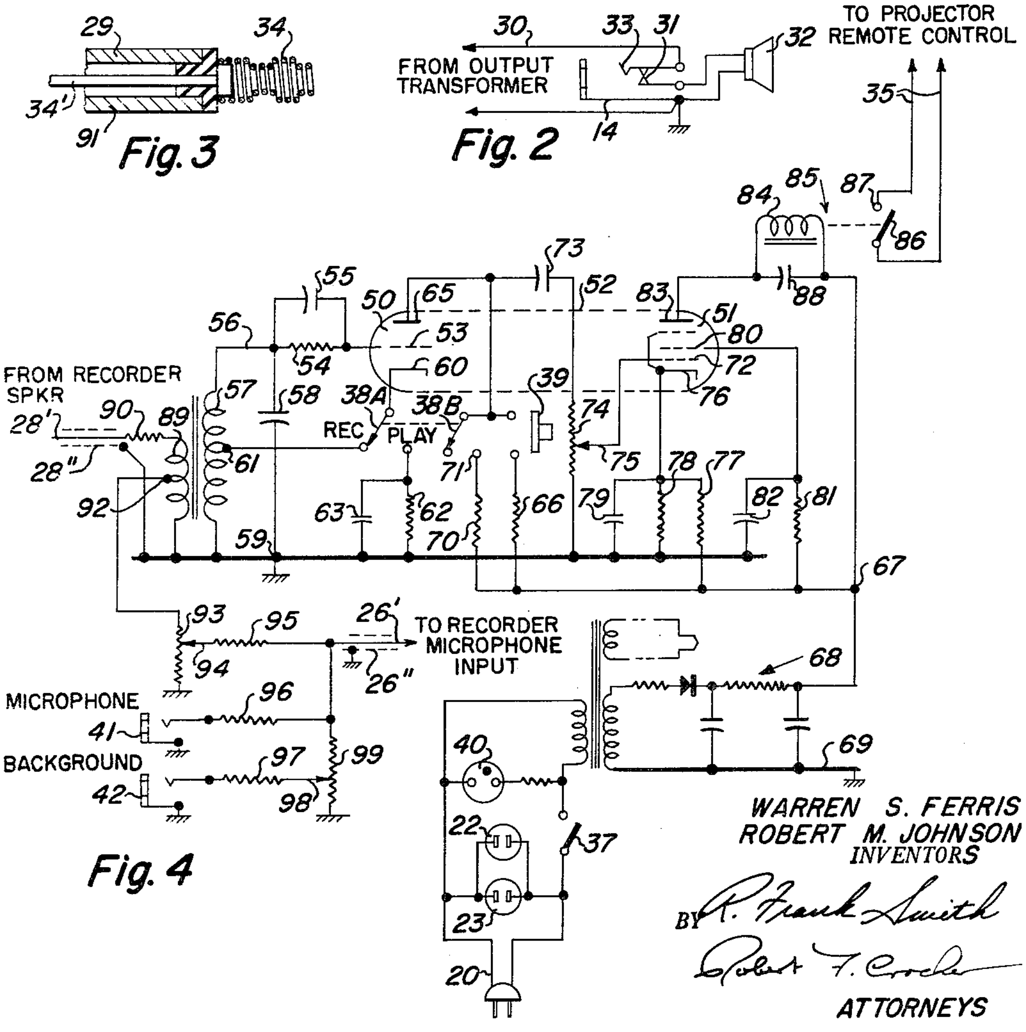
FIG. 2 is a partial schematic diagram of the audio output circuitry of a conventional tape recorder.
FIG. 3 is an enlarged sectional view of a cable plug used in conjunction with our improved apparatus.
FIG. 4 is a schematic diagram of the circuitry incorporated in our apparatus.

As shown in FIG. 2, it is customary in tape recorders having a jack 14 for an external speaker to connect the ungrounded side 30 of the line from the audio output transformer of the internal amplifier (not shown) to the internal speaker 32 by way of a pair of normally closed contacts 31 incorporated in the external speaker jack 14. The arrangement is such that, when a conventional rigid-tipped plug is inserted in the jack, the tip will engage the contact strip 33 to make electrical contact therewith and, in so doing, will flex the strip 33 so as to open the contacts 31 and thereby disconnect the internal speaker 32. However, when our apparatus is being utilized, it is desired merely to pick off the audio signal from this jack while still leaving the internal speaker 32 operative. Therefore, as shown in the greatly enlarged view, FIG. 3, instead of the usual rigid ball-like tip customarily utilized on plugs of this general type, plug 29 is provided with a resilient tip 34 formed, as clearly shown therein, from coiled spring wire. The flexible spring tip 34 on plug 29 is of insufficient rigidity to deflect the strip 33 enough to open the contact 31 but is still stiff enough to make good electrical contact therewith. Thus, in effect, when plug 29 is inserted in jack 14 it effectively connects cable 28 directly across the internal speaker 32 of the recorder, the tip 34 and barrel 91 of plug 29 constituting the signal input terminals for the programmer.

An additional two-conductor cable 35 is also provided for connection by means of plug 36 with the remote control receptacle 17 on the projector. The unit 10 is also provided with a power control switch 37, a double-pole double-throw selector switch 38 and a push button type switch 39. A suitable pilot lamp 40 may likewise be incorporated if desired. A pair of input jacks by which audio signals from a microphone 44 and/or a record player (not shown) may be fed into the unit by means of suitable cables 43 and 45 respectively, are also indicated at 41 and 42.

As shown in FIG. 4 the internal circuitry incorporated in unit 10 includes a two-stage electronic device which may conveniently be a triode 50 and a pentode 51 housed in a single envelope 52. The control electrode or grid 53 of triode 50 is connected by means of a grid leak resistor 54 and associated bypass capacitor 55 to the upper end of a parallel-resonant tank circuit 56 comprised of a tapped inductance coil 57 and a capacitor 58. The lower end of this resonant circuit is connected to the common ground or chassis as indicated at 59. The electron emitter or cathode 60 of triode 50 is adapted to be selectively connected by means of one movable contact 38A of switch 38, either to the tap 61 on coil 57 when the switch is in its RECORD position as shown in FIG. 4 or to ground by way of cathode resistor 62 and associated by-pass capacitor 63 when the switch is in the PLAYBACK position. The electron collecting electrode or anode 65 of triode 50 is connected to the other movable contact 38B of switch 38 and also to one side of a normally open push button switch 39. The other side of switch 39 is connected through a load resistor 66, of relatively low resistance, to the positive terminal 67 of a conventional power supply 68 used to provide operating potentials for the apparatus and which is controlled by the previously mentioned switch 37. The negative side of power supply 68 is connected to chassis ground as indicated at 69. A second load resistor 70 of relatively high resistance, is also connected from the positive terminal 67 to the terminal 71 adapted to be contacted by contact 38B when the switch 38 is in its PLAYBACK position.

The audio output from anode 65 of triode 50 is coupled to the control grid 72 of pentode 51 by way of capacitor 73 and a sensitivity control potentiometer 74, the movable contact 75 of which may be varied to adjust the signal level at the grid 72. The cathode 76 of pentode 51 is connected to an intermediate point on a voltage divider formed by resistors 77 and 78 connected between the positive terminal 67 and ground. Thus a positive operating bias is applied to the cathode 76. Resistor 78 is provided with the usual bypass capacitor 79. Operating potential is applied to the screen grid 80 by means of a suitable dropping resistor 81 connecting to terminal 67, the screen being bypassed to ground, for audio signals, by bypassing capacitor 82. The anode 83 of pentode 51 is connected through the coil 84 of a relay 85 to the positive terminal 67. The normally open contacts 86 and 87 of relay 85 are connected to the two conductors in cable 35 so that when relay 85 is energized these contacts 86 and 87 will be caused to effectively short across the remote control contacts 18 and 19 to initiate a slide-changing operation. A capacitor 88 is connected in parallel with the coil 84 of relay 85 for purposes which will be explained herebelow.

Inductively coupled to coil 57 is a second coil 89 one end of which is grounded and the opposite end of which is connected through a relatively low value resistor 90 to the inner conductor 28′ of cable 28 which, in turn, is connected at its opposite end by means of the inner conductor 34′ of plug 29 (see FIG. 2) to the flexible tip 34 thereof. The outer conductor or shield 28″ of cable 28 is grounded and has its other end connected to the barrel 91 of plug 29. By this arrangement audio signals appearing across the speaker 32 of the recorder will be coupled into the tuned circuit 56.

A tap 92 on coil 89 is also connected through a potentiometer 93 to ground. The movable contact 94 of potentiometer 93 is in turn connected through isolating resistor 95 to the inner conductor 26′ of the cable 26, the outer conductor 26″ of which is also grounded as shown. Microphone jack 41 is also connected through isolating resistor 96 to inner conductor 26′. Background input jack 42 is connected through isolating resistor 97 to the movable contact 98 of a potentiometer 99, one end of which is likewise connected to conductor 26′ and the other end of which is grounded.

From the above description it will be apparent that when switch 38 is in the RECORD position as shown in FIG. 4, triode 50 will be connected to the tuned circuit 56 in such a way that it forms therewith a Hartley oscillator, the frequency of oscillation of which is controlled primarily by the resonant frequency of this tuned circuit. This oscillator will become operative whenever push button 39 is pressed to complete the anode circuit through load resistor 66. Since resistor 66 is in series with the A.C. signal path from the anode to the ground end of the tuned circuit its value should be no higher than is necessary to obtain an output signal across it of sufficient intensity to render amplifier pentode 51 conductive and to thereby pick up the relay 84, since this signal path must be of relatively low impedance at the resonant frequency in order for oscillations to be maintained. Operation of triode 50 as an oscillator will not only energize relay 84 to cause the latter to close its contacts 86 and 87 to initiate a slide-changing operation of the projector 12, but will also cause a voltage to be induced in the coil 89 which will be applied through potentiometer 93 and resistor 95 to the microphone input of the tape recorder thereby causing recording of a signal pulse of this same frequency on the tape. While almost any desired frequency of oscillation could be employed, we have found that a frequency in the neighborhood of 6500 cycles is especially well adapted for such control pulses. Such pulses, when being reproduced, are of sufficiently high pitch that they are barely noticeable to the listener, particularly if they occur at the same time that background music or commentary is being reproduced. Moreover, they are not so high but that they are still within the effective frequency response characteristics of substantially all general-purpose tape recorders. It is to be noted that resistors 93 through 99 form a mixing network connected to the recorder microphone input and that, by suitable adjustment of the potentiometers 93 and 99 and the usual gain control (not shown) on the recorder, the relative level of the slide-changing control pulses, the audio commentary, and the background music may be readily controlled.

When the switch 38 is moved to the PLAYBACK position, triode 50 is converted from an oscillator to a frequency selective amplifier which will be particularly sensitive to input signals corresponding in frequency to the resonant frequency of tank circuit 56. Any such signals which are of sufficient intensity and duration will be further amplified by pentode 51 and will energize relay 84 to cause a slide-changing operation of the projector. Such signals, as previously indicated, will be derived from the speaker circuit of the recorder (when the latter is operating to reproduce the prerecorded material) and will be applied through the resistor 90 to the coil 89 which, in turn, will couple them into the tuned input circuit 56 of triode 50 where they are effectively separated from the other audio signals present. Resistor 90, combined with the impedance reflected into the coil 89, should be sufficiently large that when this resistor and coil 89 in series therewith are connected across the speaker (by plugging plug 29 into jack 14) they will produce no substantial loading of the audio output system of the recorder. While some of the audio output from the recorder speaker will also be applied through resistors 93 and 95 to the recorder input, this will have no effect since, when the recorder/reproducer is set for PLAYBACK, the recorder input will automatically be rendered inoperative in accordance with usual practice. The actual signal voltage appearing at the grid 53 of triode 50 during PLAYBACK as a result of a control pulse will normally be much lower in amplitude than that which occurs while the triode is operating as an oscillator. It is therefore desirable to utilize a load resistor 70 of relatively high resistance so that the resulting output signal appearing at the anode of triode 50 will be of sufficiently high value to insure that pentode 51 will pick up relay 85. This is brought about automatically when switch contact 38B moves into contact with terminal 71, whenever switch 38 is thrown to PLAYBACK. The actual signal level at the grid 72 of pentode 51 may be adjusted to the proper operating value by adjustment of the sensitivity control potentiometer 74.

Capacitor 88 is provided across the relay coil 84 to insure that only the desired pulses will pick up relay 85. Preferably the control pulses will be of at least ½ second duration and capacitor 88 should be of such value that, in combination with the resistance in the anode circuit of pentode 51, it will have a time constant of sufficient duration that the voltage across this capacitor will not rise to a level sufficient to pick up relay 85 until pentode 51 has been conductive for substantially this length of time. The likelihood of an audio output of this particular frequency and of this great a duration occurring as a result of the background music or commentary is extremely small so that, in spite of the fact that the signal pulses are within the audio range, there is little likelihood of improper operation.

While, except for certain general relationships which have been discussed above, there is nothing particularly critical as to the values of the various components which may be utilized, the following values have been found quite suitable for such a unit utilizing a 6AN8 triode-pentode with an anode supply voltage from the power supply 68 of about 120 volts, and a control relay 85 of about 10,000 ohms impedance. Units thus constructed have been found to operate extremely effectively in conjunction with a great variety of commercially available tape recorders.

*Resistors*

| Ref. No.: | Value (ohms) |
|---|---|
| 54 | 4,700 |
| 62 | 470 |
| 66 | 470 |
| 70 | 15,000 |
| 74 | 500,000 |
| 77 | 24,000 |
| 78 | 910 |
| 81 | 22,000 |
| 90 | 22 |
| 93 | 500,000 |
| 95 | 470,000 |
| 96 | 470,000 |
| 97 | 470,000 |
| 99 | 500,000 |

*Capacitors*

| Ref. No. | Value (mfd.) |
|---|---|
| 55 | .005 |
| 58 | .047 |
| 63 | 10 |
| 73 | .002 |
| 79 | 10 |
| 82 | 0.1 |
| 88 | 0.1 |

Obviously in place of the 6AN8 tube, other tubes or transistors could be substituted without changing the principle of operation. The particular values of the other components will, of course, depend upon the particular tubes or transistors utilized and selection of the proper values is well within the ability of one skilled in the electronics art. While we have shown the use of a Hartley type oscillator circuit other known oscillator circuits could be used without altering the underlying principle of our invention. Many other possible changes will be apparent to those skilled in the art and could likewise be made without departing from the spirit and scope of our invention as defined by the appended claims.

We claim:

1. A control unit for correlating the operation of a picture projector of the type having remotely controllable picture-changing mechanism including remote control terminals therefor and a separate sound-recording-and-reproducing unit of the type having an audio amplifier and including audio input terminals and speaker output terminals for connecting an external speaker thereto; said control unit comprising: a relay having switch contacts, connection means for electrically connecting said switch contacts to the remote control terminals of a projector to be controlled thereby, a tuned parallel-resonant electrical circuit; means for coupling energy between said resonant circuit and the audio input and speaker output terminals of a recording-and-reproducing unit to be operated with said projector, said resonant circuit being resonant at a predetermined audio frequency lying well within the normal audio pass band of said recording-and-reproducing unit, a triode having a cathode, an anode, and a control grid, a source of D.C. operating potentials for said triode, the negative side of which constitutes a common circuit ground, and means interconnecting said resonant circuit, said triode and said potential source and including means connecting said resonant circuit between said grid and said circuit ground, a cathode resistor, first and second load resistors, a normally open switch in series with said first load resistor, and a selector switch operative in a first condition to connect said cathode to an intermediate point on said resonant circuit and to connect said anode to the positive side of said potential source through said first load resistor and said normally open switch whereby, when said last mentioned switch is closed said triode will operate in conjunction with said resonant circuit as an oscillator producing control signals of said predetermined frequency in said coupling means, and said selector switch being operative in a second condition to connect said cathode to said circuit ground through said cathode resistor and to connect said anode to the positive side of said potential source through said second anode resistor whereby said triode will operate in conjunction with said resonant circuit as a frequency-selective amplifier responsive to control signals of said predetermined frequency applied thereto by said coupling means and means rendering said relay responsive to control signal output of at least a predetermined minimum duration from said triode during either mode of operation.

2. A control unit as in claim 1 wherein said last means includes sensitivity control means rendering said relay responsive to the control signal output from said triode only when the amplitude of the latter is at least equal to a predetermined minimum value.

3. A control unit as in claim 1 wherein said last means includes time-controlled circuitry responsive to the duration of the control signal output from said triode for preventing operation of said relay until said signal output has continued for at least a predetermined minimum time.

4. A control unit as in claim 1 wherein said last means operatively connects said relay to the anode of said triode.

5. A control unit as in claim 4 wherein said first anode resistor is of much lower value than that of said second anode resistor.

References Cited by the Examiner

UNITED STATES PATENTS

| | | | |
|---|---|---|---|
| 2,529,097 | 11/1950 | Mullin | 179—100.1 |
| 2,811,588 | 10/1957 | Julie | 179—100.1 |
| 2,975,672 | 3/1961 | Shields | 88—28 |

IRVING L. SRAGOW, *Primary Examiner.*

EMIL G. ANDERSON, BERNARD KONICK, *Examiners.*